United States Patent
Bochen et al.

(10) Patent No.: US 9,394,738 B2
(45) Date of Patent: Jul. 19, 2016

(54) SYSTEM FOR OPENING AND CLOSING A FLAP

(71) Applicants: Marian Bochen, Eitelborn (DE); Frank Doffing, Kastellaun (DE); Rolf Mintgen, Dornbirn (AT); Thomas Reif, Kobern-Gondorf (DE)

(72) Inventors: Marian Bochen, Eitelborn (DE); Frank Doffing, Kastellaun (DE); Rolf Mintgen, Dornbirn (AT); Thomas Reif, Kobern-Gondorf (DE)

(73) Assignee: Stabilus GmbH, Koblenz (DE)

( * ) Notice: Subject to any disclaimer, the term of this patent is extended or adjusted under 35 U.S.C. 154(b) by 0 days.

(21) Appl. No.: 14/189,561

(22) Filed: Feb. 25, 2014

(65) Prior Publication Data
US 2014/0173988 A1    Jun. 26, 2014

Related U.S. Application Data

(62) Division of application No. 12/291,264, filed on Nov. 6, 2008, now abandoned.

(30) Foreign Application Priority Data

Nov. 13, 2007   (DE) .......................... 10 2007 054 447
Feb. 19, 2008   (DE) .......................... 10 2008 009 898

(51) Int. Cl.
| | |
|---|---|
| *E05F 15/53* | (2015.01) |
| *B60J 5/10* | (2006.01) |
| *E05F 15/611* | (2015.01) |
| *E05F 15/616* | (2015.01) |

(52) U.S. Cl.
CPC .................. *E05F 15/53* (2015.01); *B60J 5/102* (2013.01); *E05F 15/611* (2015.01); *E05F 15/616* (2015.01); *E05Y 2900/546* (2013.01)

(58) Field of Classification Search
CPC ....... E05F 15/616; E05F 15/611; E05F 15/63; E05F 15/53; B60J 5/102; Y10T 16/276; Y10T 16/281
See application file for complete search history.

(56) References Cited

U.S. PATENT DOCUMENTS

| | | | |
|---|---|---|---|
| 4,936,424 A * | 6/1990 | Costa | F16F 9/064 188/314 |
| 5,588,258 A | 12/1996 | Wright et al. | |
| 5,944,376 A * | 8/1999 | Buchanan, Jr. | 296/146.4 |
| 5,988,608 A * | 11/1999 | Koch | 267/120 |
| 6,092,336 A * | 7/2000 | Wright et al. | 49/339 |
| 6,357,813 B1 | 3/2002 | Vandeberghe et al. | |

(Continued)

FOREIGN PATENT DOCUMENTS

| | | |
|---|---|---|
| DE | 4007162 A1 | 9/1991 |
| DE | 19706919 C1 | 10/1998 |
| DE | 102005030052 A1 | 12/2006 |

*Primary Examiner* — Katherine Mitchell
*Assistant Examiner* — Marcus Menezes
(74) *Attorney, Agent, or Firm* — Cozen O'Connor (57) ABSTRACT

A system for opening and closing a motor vehicle, the flap is swivalably mounted along one of its edge areas at a stationary structural component part about a horizontal swiveling axis. A first drive device and a second drive device act in parallel to more like flap from a closed position into an open position. The first drive device is a non-self-locking drive device, and the second drive device comprises a cylinder filled with a fluid under pressure. An interior of the second drive device is divided by a piston into a first work chamber and a second work chamber, wherein a piston rod of the piston is guided outward through the first work chamber. A valve arrangement in the piston closes a flow connection between the first work chamber and the second work chamber in a stationary operating state of the flap.

20 Claims, 7 Drawing Sheets

(56) References Cited

U.S. PATENT DOCUMENTS

| | | | |
|---|---|---|---|
| 6,491,292 B2 * | 12/2002 | Stumm et al. | 267/225 |
| 6,516,567 B1 | 2/2003 | Stone et al. | |
| RE38,400 E | 1/2004 | Kowall et al. | |
| 6,719,356 B2 * | 4/2004 | Cleland et al. | 296/146.8 |
| 7,137,174 B2 | 11/2006 | Derbis et al. | |
| 7,226,111 B2 * | 6/2007 | Berklich et al. | 296/146.4 |
| 7,234,757 B2 | 6/2007 | Mitchell | |
| 7,320,198 B2 * | 1/2008 | Berklich et al. | 49/343 |
| 7,506,556 B2 * | 3/2009 | Ritter | E05F 15/63 296/56 |
| 7,547,058 B2 | 6/2009 | King et al. | |
| 7,566,092 B2 * | 7/2009 | Paton et al. | 296/146.8 |
| 7,808,197 B2 | 10/2010 | Kimura et al. | |
| 7,866,728 B2 | 1/2011 | Suzuki | |
| 2004/0139656 A1 | 7/2004 | Takeda et al. | |
| 2005/0155289 A1 | 7/2005 | Oberheide | |
| 2005/0179280 A1 * | 8/2005 | Ritter | E05F 15/63 296/76 |
| 2006/0042166 A1 * | 3/2006 | Berklich et al. | 49/341 |
| 2006/0043763 A1 | 3/2006 | Berklich et al. | |
| 2006/0082188 A1 | 4/2006 | Mitchell | |
| 2007/0062119 A1 * | 3/2007 | Ritter | 49/343 |
| 2007/0062199 A1 | 3/2007 | Ritter | |
| 2007/0137331 A1 | 6/2007 | Kachouh | |
| 2007/0261310 A1 * | 11/2007 | Porat et al. | 49/340 |
| 2008/0060273 A1 | 3/2008 | Bochen et al. | |
| 2008/0092447 A1 | 4/2008 | Bienek | |
| 2008/0216409 A1 | 9/2008 | Bochen et al. | |

* cited by examiner

SYSTEM FOR OPENING AND CLOSING A FLAP

CROSS REFERENCE TO RELATED APPLICATIONS

This application is a divisional of U.S. patent application Ser. No. 12/291,264 which was filed with the U.S. Patent and Trademark Office on Nov. 6, 2008. Priority is claimed for this invention and application, corresponding applications having been filed in Germany on Nov. 13, 2007, No. 10 2007 054 447.4; and Germany on Feb. 19, 2008, No. 10 2008 009 898.1 respectively.

BACKGROUND OF THE INVENTION

1. Field of the Invention

The invention relates to a system for opening and closing a flap for a motor vehicle mounted along one of its edge areas to a stationary structural component so as to be swivelable around a horizontal swiveling axis. The flap is driven by a first drive device and a second drive device acting in concert so as to be movable from a closed position into an open position, wherein the first drive device is an electromechanical drive device and the second drive device is a hydraulic, pneumatic, or hydropneumatic drive device.

2. Description of the Related Art

Opening and closing systems for vehicle flaps are known for opening and closing flaps such as hatchbacks, trunk lids, engine hoods, doors, and the like in motor vehicles. Often, both sides of the flap are driven electromechanically so as to prevent warping of the flaps when the flaps are open and closed.

Some drive systems are used that drive the flaps electromechanically on only one side, while a gas spring is arranged at the other side of the flap. The gas spring counterbalances the weight of the flap by substantially supporting only the opening of the flap. An opening and closing system of this kind is generally better than the variant that is driven electromechanically on both sides and is therefore preferred for installation in most applications.

In systems that are driven electromechanically on one side it is disadvantageous that the electromechanical drives are outfitted with pressure springs, typically embodied as helical pressure springs, which must counterbalance the weight of the flap so that the motor has reasonable dimensions in terms of the vehicle construction and the flap can be safely held in a partially closed position or in the completely open position.

Further, it is disadvantageous with respect to installation space when the flap is stopped in desired positions by other braking elements or clamping elements.

SUMMARY OF THE INVENTION

Therefore, it is an object of the invention to provide an opening and closing system for flaps that overcomes the disadvantages described above and has a simple, space-saving construction with few structural component parts.

According to one embodiment of the invention, the first drive device is a non-self-locking drive device and the second drive device comprises a cylinder that is filled with a fluid under pressure and whose closed first end is connected to the stationary structural component part or flap at a distance from the swiveling axis. The interior of the second device is divided by a piston into a first work chamber and a second work chamber, wherein a one-sided piston rod of the piston is guided outward through the first work chamber and out of the first work chamber so as to be sealed by a sealing and guiding package and is connected to the flap or stationary structural component part at a distance from the swiveling axis, with a valve arrangement by which a flow connection between the first work chamber and the second work chamber is closed in a stationary operating state of the flap.

The flow connection between the first work chamber and the second work chamber is opened during a movement of the flap so that a fluid balance is achieved between these two work chambers.

When flap movement is concluded, the flow connection is closed and the flap is held in its occupied position.

The first drive device is preferably arranged at a first edge area of the flap and the second drive device is preferably arranged at a second edge area of the flap, which proceeds at least approximately at right angles from the swiveling axis.

This configuration limits warping of the flap due to an imbalanced application of force.

The flap can be a hatchback, a trunk hood, engine hood, or the like in the motor vehicle.

The flap is preferably supported along its upper edge area so as to be swivelable around the swiveling axis and is directed substantially perpendicularly downward in the closed position and substantially horizontally in the open position.

Because a fluid equilibrium is blocked when the flow connection is closed, the flap remains securely held in its occupied position even in horizontal orientation.

It is particularly economical in terms of space when the first drive device has a spindle drive driven in rotation by a rotary drive and which has a threaded spindle that is connected to the flap or to the stationary structural component part, and a spindle nut that is arranged on the threaded spindle that is connected to the stationary structural component part or to the flap.

To reduce the rotating speed of the rotary drive, the threaded spindle is driven in rotation by the rotary drive by a non-self-locking gear unit. Due to the non-self-locking construction of the gear unit, as well as the non-self-locking construction of the entire drive device, the flap is easily moved by hand when the first drive device is not activated. The rotary drive is preferably an electric motor.

When the rotary drive, threaded spindle, spindle nut and, the gear unit are all preferably arranged in a tubular housing, a compact constructional unit is achieved which protects these components.

A spindle tube preferably encloses the threaded spindle with play and is connected to the spindle nut by its axial end that is closer to the rotary drive and can be articulated at the stationary structural component part or the flap by its end remote of the rotary drive.

In a preferred embodiment, the protective tube is arranged so as to be displaceably guided on the end area of the tubular housing remote of the rotary drive and is connected to the spindle nut and articulated at the stationary structural component part or flap by its end remote of the rotary drive, the part of the system that is movable in a telescoping manner relative to the tubular housing is also externally protected.

In one embodiment, the second drive device is a gas spring and the first work chamber and second work chamber are filled with a gas under pressure. The gas acting upon the larger effective surface of the piston generates the push-out movement of the piston rod.

In one embodiment of the invention, a piston rod extension extends farther in the direction of the first end of the cylinder, opposite the end of the piston rod located in the cylinder. Preferably, the piston is arranged coaxial to the cylinder.

A second piston is preferably arranged at the end of the piston rod extension. The second piston is a mirror image of the first piston.

The two pistons have a closing spring with identical or different spring forces.

In one embodiment, the cylinder of the second drive device has a flexible wall, particularly a dividing piston that is axially displaceable in the cylinder so as to be sealed. This defines a partial space between the closed end of the cylinder and the second work chamber in the cylinder. The partial space is filled with a gas under pressure, and the first work chamber and second work chamber are filled with an incompressible fluid, preferably an oil.

The flexible wall, holds the fluid under pressure in the second work chamber in conjunction with the gas that is under pressure to generate the push-out movement of the piston rod by the greater effective surface of the piston.

In one embodiment, the valve arrangement has a closing valve with a valve element by which three switching positions can be occupied, wherein, proceeding from a middle closed switching position, a first opening position can be occupied by the valve element in one direction and a second open position can be occupied by the valve element in the other direction.

For a further development of this closing valve, reference is made to U.S. Pat. No. 5,988,608 whose disclosure is incorporated by reference.

In another embodiment, the valve arrangement has an electrically controllable magnetic valve, wherein the magnetic valve is powered on to open the flow connection between the first work chamber and the second work chamber by controlling the first drive device for the flap adjustment.

The valve arrangement can be arranged at any suitable location of the second drive device.

When the valve arrangement is arranged in or at the piston, installation space is minimized.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

Embodiment examples of the invention are shown in the drawings and are described more fully in the following.

DETAILED DESCRIPTION OF THE PRESENTLY PREFERRED EMBODIMENTS

Figure 1:
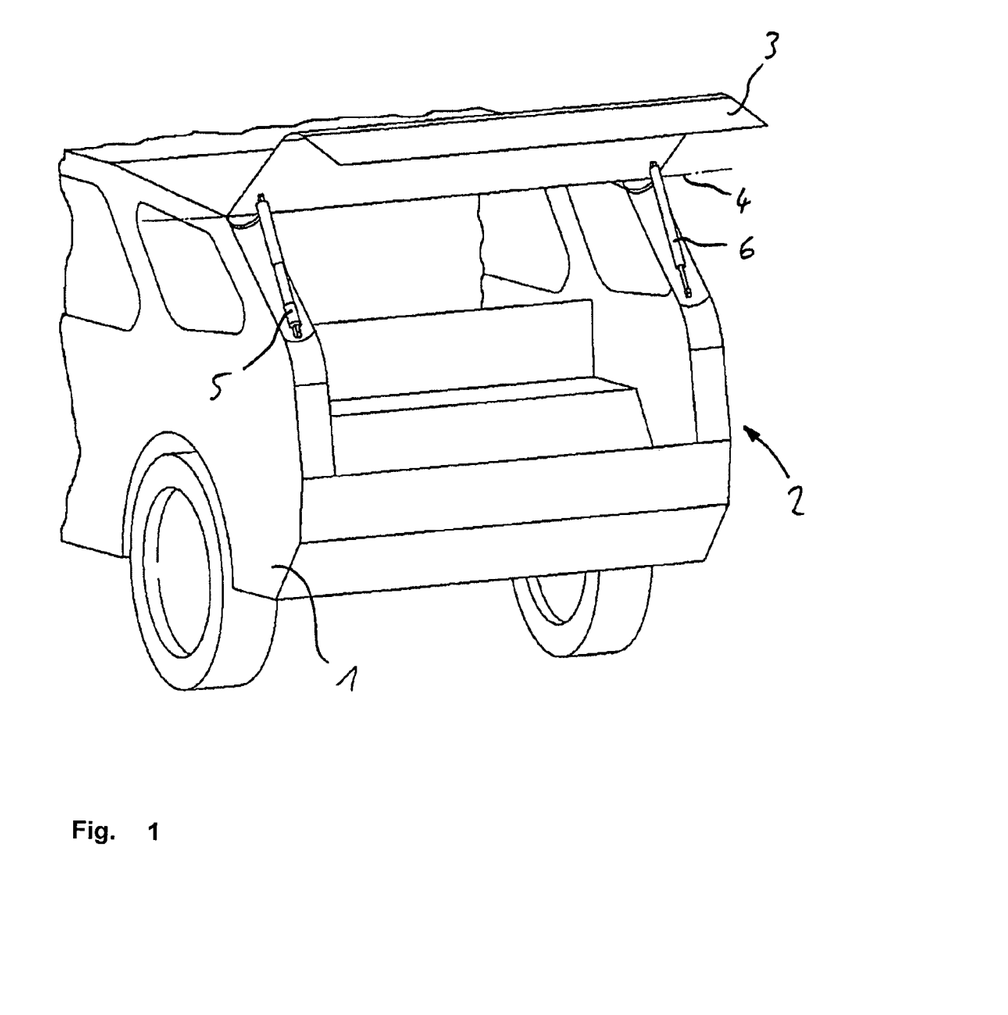
FIG. 1 shows a schematic view of a motor vehicle with a swivelably driven hatchback.

FIG. 1 is a schematic view of a motor vehicle with a car body as a basic part 1 and a movable part 3 which closes or opens an aperture 2 in the basic part 1 and which is constructed as a hatchback, hereinafter flap 3. The flap 3 can also be a front hood, an engine hood, a vehicle door, or the like.

The flap 3 is preferably mounted in a horizontal swiveling axis 4 extending transverse to the vehicle. It should be noted that the swiveling axis need not be horizontal but many, for example, be vertical or any other angle. A first drive device 5 is arranged at one side of the flap 3 and a second drive device 6 is arranged at the opposite side of the flap 3.

Figure 2:
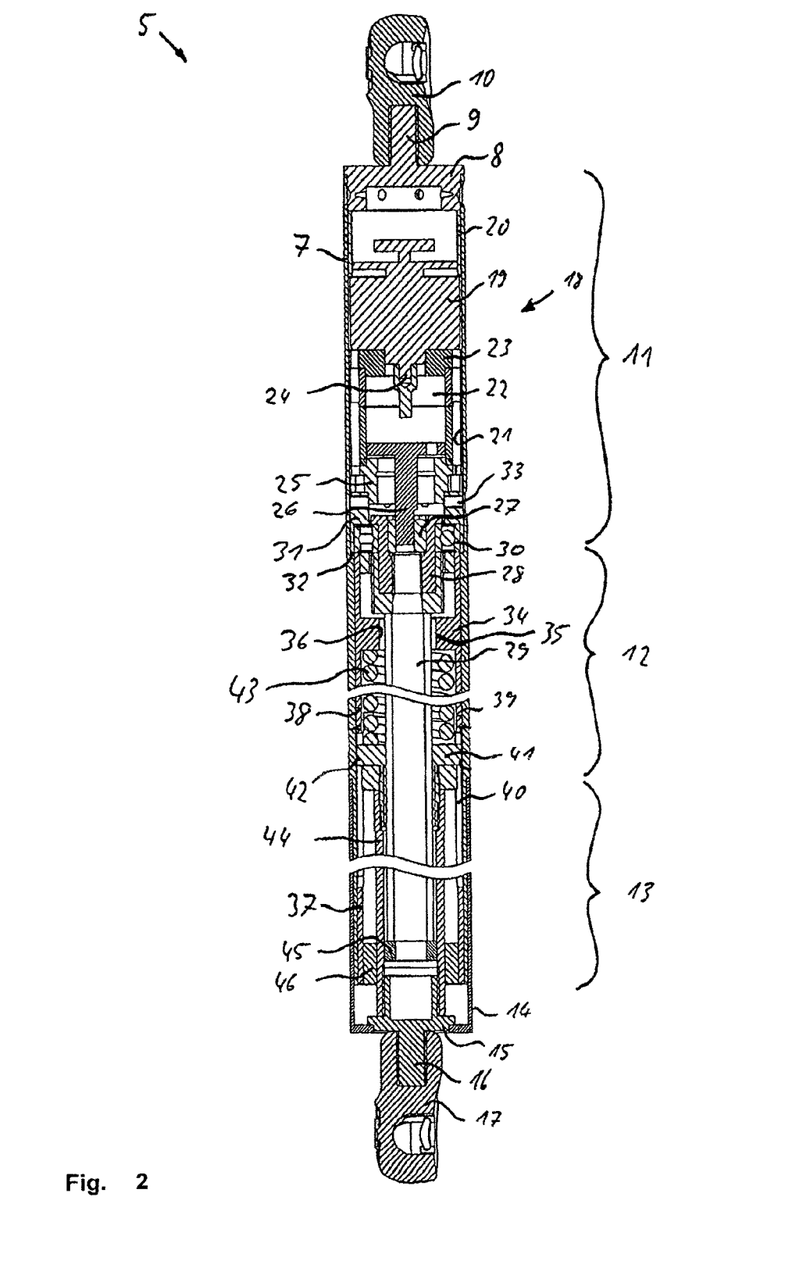
FIG. 2 shows an embodiment form of an electromechanical drive according to the invention.

FIG. 2 depicts one of the two drive devices, embodied as an electromechanical drive device, which is associated with the first drive device 5 in the following description for the sake of simplicity. It should be noted that the drive device shown in FIG. 2 may alternatively be associated with second drive device 6.

The first drive device 5 has a tubular housing 7 that is closed at one end by a base piece 8. The base piece 8 has a threaded pin 9 on which a connection element 10 is screwed.

The housing 7 has a first portion 11, a second portion 12, and a third portion 13. The first portion 11 has a larger inner diameter than second portion 12 while its outer diameter preferably remains the same. Third portion 13 has a larger outer diameter than second portion 12 while the inner diameter remains the same.

A protective tube 14 whose outer diameter substantially corresponds to the outer diameter of the second portion 12 of the housing 7 is arranged over third portion 13 of the housing 7. The protective tube 14 is closed by a base piece 15 at a remote and of the housing 7. The base piece 15 has a threaded pin 16 on which a second connection element 17 is screwed.

The connection elements 10 and 17 include a ball socket, as is shown in FIG. 2, but knuckle eyes or the like can also be used. In one embodiment, the connection element is integral with the base piece or connected by other connection techniques such as welding, or creasing, or the like so that the first drive device 5 is connected in an articulated manner to a stationary structural component part of the body or to the basic part 1 of a motor vehicle and to a movable structural component part of the motor vehicle that is constructed as a flap 3.

A rotary drive 18 is arranged inside the housing 7 in the first portion 11. The rotary drive 18 comprises an electric motor 19, a sensor device in a sensor housing 20, and a gear unit 22 in a gear unit housing 21. The electric motor 19 is supported by the sensor housing 20 at the end of the housing 7 that is closed by the base piece 8. The gear unit housing 21 is supported at the electric motor 19 by an adapter element 23. The gear unit 22 arranged in the gear unit housing 21 is driven by a motor driveshaft 24. Further, the motor driveshaft 24 projects into the sensor housing 20 on the side opposite the gear unit housing 22. The electrical connection lines, not shown, comprising the power supply lines and control lines extend from the sensor housing 20, through the base piece 8 and out of the housing 7.

The gear unit housing 21 is closed at the side opposite the electric motor 19 by a housing cover 25 through which a gear unit shaft 26 extends. The end of the gear unit shaft 26 is connected to a spindle drive. An adapter insert 27 to which a spindle adapter 28 is arranged is located at the end of the gear unit shaft 26. A threaded spindle 29 is connected to the gear unit shaft 26 by the adapter insert 27 and spindle adapter 28.

The spindle adapter 28 is supported in a bearing 30. The bearing 30 is in turn arranged in a bearing sleeve 31 which is supported at the gear unit housing 22 or housing cover 25 on one side and contacts a step 32 on the other side, which step 32 is formed by the different inner diameters of portions 11 and 12. Accordingly, the rotary drive 18 is fixed together with the bearing 30 of the threaded spindle 29 in axial direction inside the first portion 11 of the housing 7. Part of the rotary drive 18 can be connected to the housing 7 by screws 33 or catches in such a way that they cannot rotate relative to the housing.

A spring sleeve 34 is supported at the bearing 30 or at the bearing sleeve 31 located substantially in the second portion 12 so as to contact the inner wall of the housing 7. A wall 35 with a bore hole 36 is formed in the interior of the spring sleeve 34. The threaded spindle 29 extends through bore hole 36. The spring sleeve 34 is lengthened by a guide tube 37 to the end of the housing 7 proceeding from the second portion 12 of the housing 7 in direction of the third portion 13. Spring sleeve 34 and guide tube 37 each have, at their sides contacting one another, projections 38 and complementary recesses 39 and are accordingly arranged so as to be fixed with respect to rotation relative to one another. Further, the guide tube 37 has at least one groove 40 which extends in axial direction and which can also be constructed as a slot, and a projection 42 formed at a spindle nut 41 projects into this groove 40.

A spring device 43 which partially surrounds the threaded spindle 29 extends from the side of the wall 35 remote of the bearing 30 in direction of the third portion 13 of the housing 7 and makes contact with the spindle nut 41 running on the threaded spindle 29, in particular when the first drive device 5 is inserted, i.e., when the flap 3 is in its almost fully closed position. The spring device 43 urges the spindle nut 41 away from the wall 35 when opening the flap 3 out of its completely closed position and the rotary drive 18 therefore supports at least the first centimeter of the flap-opening movement.

An axially movable spindle tube 44 is guided with the spindle nut 41 in the guide tube 37 and is arranged with one end at the spindle nut 41 and with its other end at the base piece 15 of the protective tube 14. The threaded spindle 29 has, at the end near the base piece 15, a guide ring 45 that is arranged in the spindle tube 44 to prevent radial swiveling of the threaded spindle 29.

Another guide ring 46 is arranged between the spindle tube 44 and the end of the housing 7 near the connection element 17, which also prevents a radial swiveling of the structural component parts that move in a telescoping manner and forms a stable protection against buckling.

Figure 3:
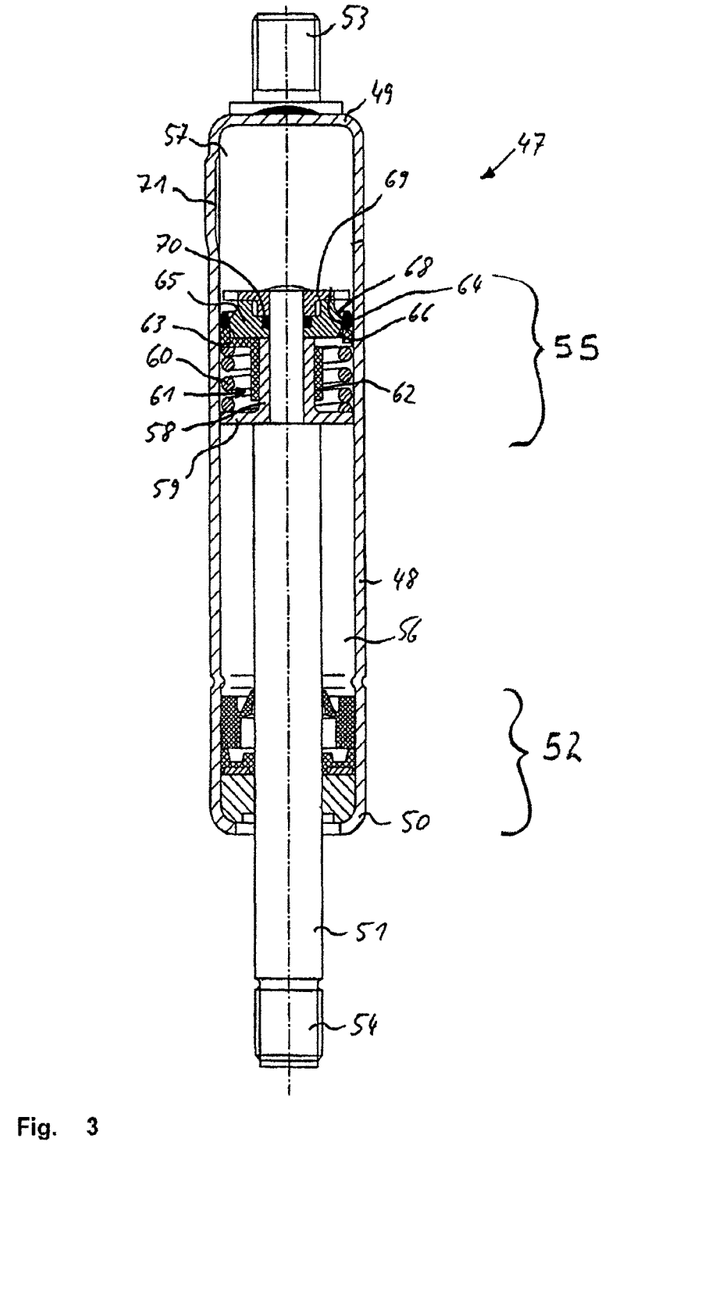
FIG. 3 shows an embodiment form of a hydropneumatic drive according to the invention.

FIG. 3 shows an example of a drive device in the form of a piston-cylinder unit 47, which is preferably associated with the second drive device 6.

The piston-cylinder unit 47 is preferably constructed as a gas spring and is filled with a gaseous medium under pressure. The piston-cylinder unit 47 comprises a cylinder 48 with a closed first end 49 and a second end 50 located opposite the closed end. A piston rod 51 arranged coaxial to the cylinder 48 is guided out of the cylinder 48 through the second end 50 by a sealing and guiding package 52. Connection devices 53 and 54 are arranged at the closed end 49 of the cylinder and at the end of the piston rod 51 lying outside of the cylinder. The connection devices 53, 54 can receive connection elements, not shown, such as ball sockets, knuckle eyes, or the like.

A piston 55 divides the piston-cylinder unit 47 into a first work chamber 56 on the piston rod side and a second work chamber 57 remote of the piston rod arranged at the end of the piston rod 51 located in the cylinder 48. The piston 55 comprises a stationary guide sleeve 58, which has a circumferential supporting edge 59 for a closing spring 60. The closing spring 60 biases a slide 61, centered with a slide sleeve 62, on the guide sleeve 58. The closing spring 60 acts on a circular slide surface 63 whose axial end portion cooperates with a sealing ring 64. The sealing ring 64 forms an axially movable valve element that occupies various switching positions on a valve ring 65.

The outer surface of the valve ring 65 is contoured, which, in one embodiment, makes possible three switching positions. Considered from the slide surface 63, the valve ring 65 has a first valve seat surface in the form of an inclined surface 66, a second valve seat surface in the form of a clamping surface 67, and a third valve surface in the form of an inclined surface 68. It should be noted that additional surfaces are provided in other embodies to provide additional switching positions. A stop ring 69 clamps the entire construction of the piston 55. A valve ring seal 70 prevents leakage between the pin of piston rod 51 and the valve ring 65.

To allow the medium to flow faster in the area of the cylinder 48 in which the piston 55 is located when the flap 3 is almost closed so as to ensure a more powerful lifting out of the closed position of the flap 3 and falling into the flap lock, a groove 71 extending in axial direction is preferably formed in the cylinder.

Figure 4:
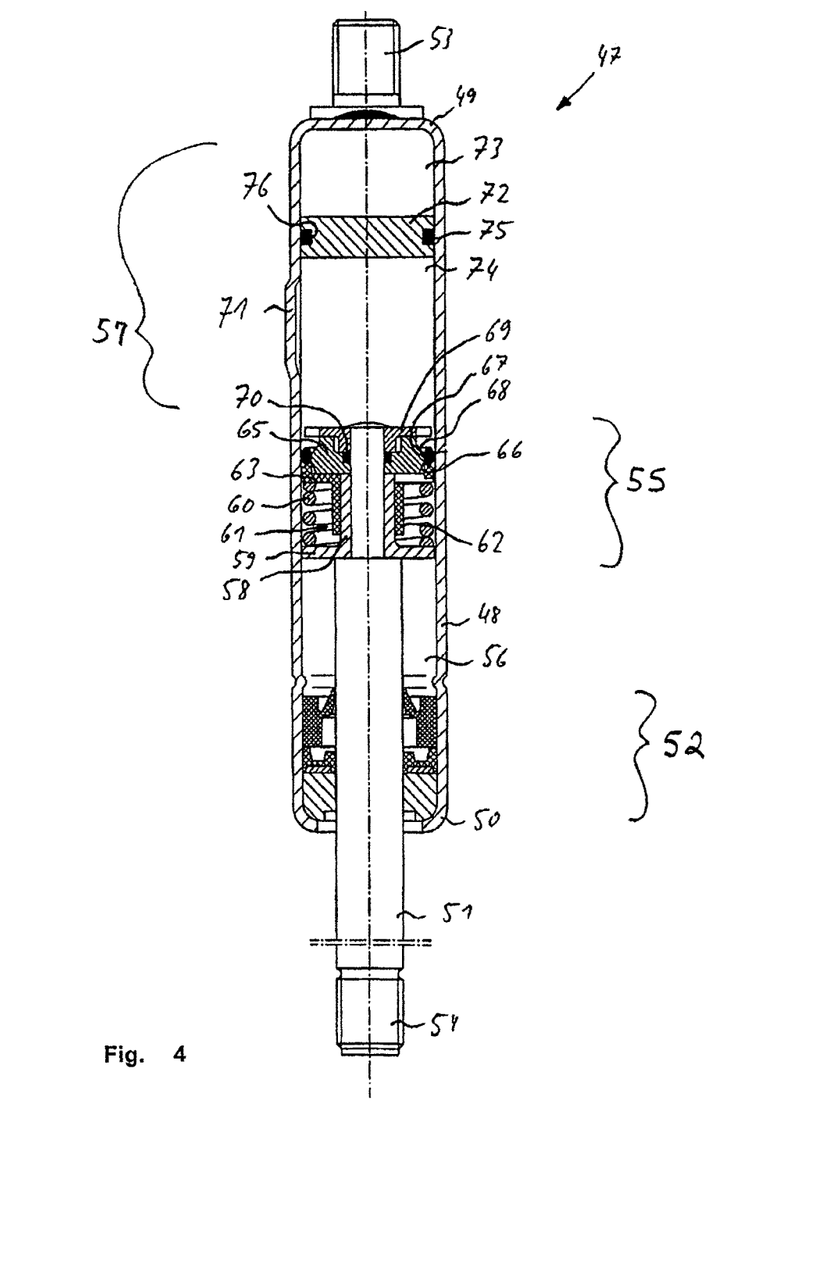
FIG. 4 shows embodiment form of a hydropneumatic drive.

FIG. 4 shows another second drive device. In many respects, this embodiment corresponds to the embodiment shown in FIG. 3. Therefore, identical structural component parts are provided with the same reference numbers and are not described in more detail.

In contrast to the piston-cylinder unit 47 shown in FIG. 3, a dividing piston 72 divides the second work chamber 57 remote of the piston rod into a first partial space 73 in the vicinity of the first end 49 of the cylinder 48 and a second partial space 74 remote of the first end 49. The first partial space 73 is filled with a gas under pressure, while the first work chamber 56 and the second partial space 74 are filled with oil. A sealing ring 75 is inserted into a groove 76 of the dividing piston 72 so that the oil and gas do not mix.

To allow the oil to flow faster in the area of the cylinder 48 in which the piston 55 is located when the flap 3 is almost closed, a groove 71 extending in an axial direction is formed in the cylinder 48. Groove 71 is located substantially in the second partial space 73 near the dividing piston 72. However, a sufficient distance is provided so that the dividing piston 72 cannot be displaced over groove 71.

Figure 5:
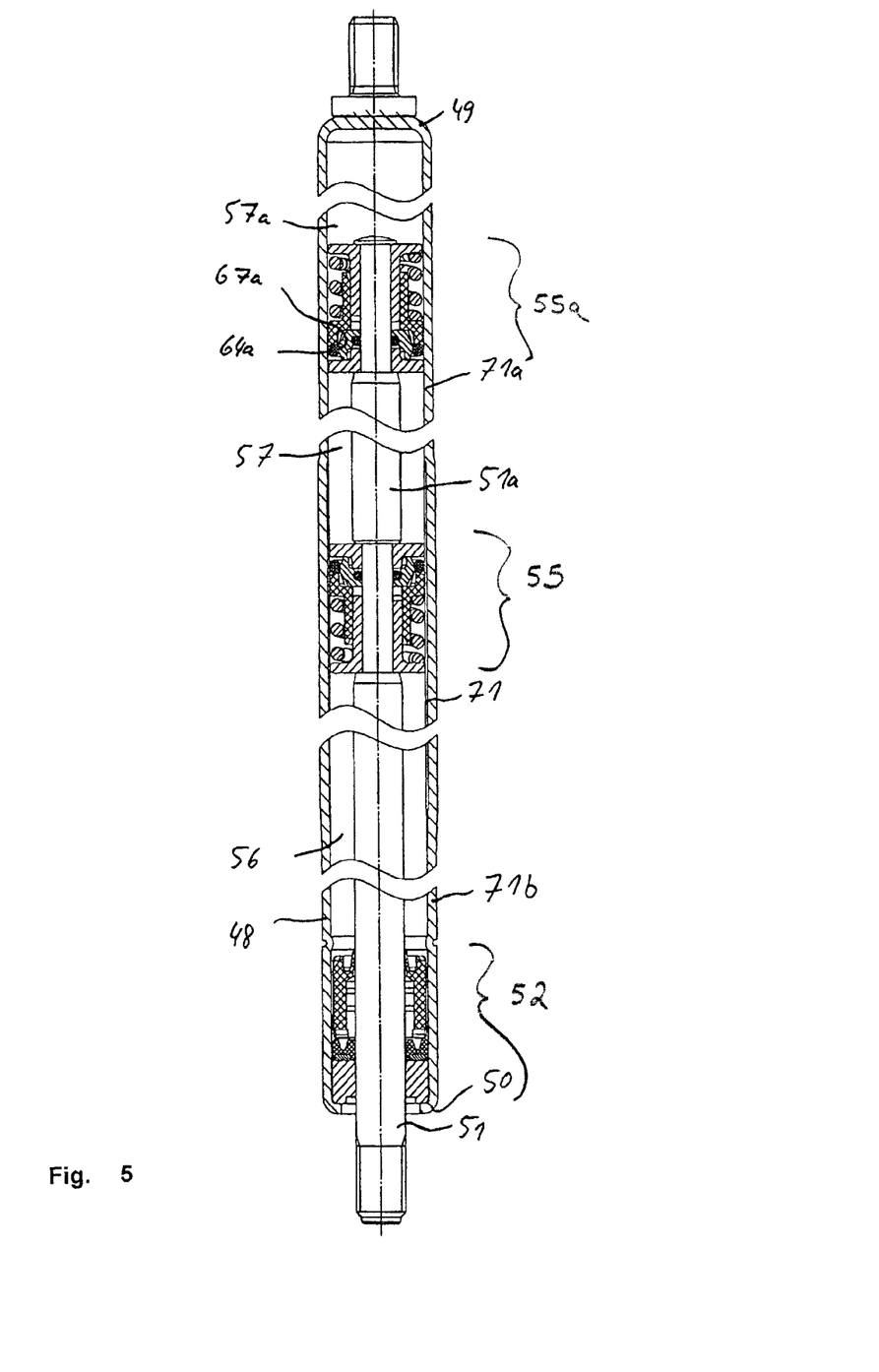
FIG. 5 shows embodiment form of a hydropneumatic drive.

FIG. 5 shows another second drive device 6. In many respects, this embodiment corresponds to the embodiment shown in FIG. 3. Therefore, identical structural component parts are provided with the same reference numbers and are not described in more detail.

A piston rod extension 51a extends coaxial to the cylinder 48 from the end of the piston rod 51 lying in the cylinder 48 and the piston 55 arranged at the latter farther in direction of the first end 49 of the cylinder 48. A piston 55a has the same construction and the same shape as piston 55 but opposite orientation, and is arranged at the end of the piston rod extension and divides the second work chamber 57 again. The third work chamber located opposite from the piston rod extension 51a is designated by reference number 57a.

In contrast to the piston-cylinder unit 47 shown in FIG. 3, a first area 71a in which there is no groove is formed near the first end 49 and a second area 71b in which there is no groove is formed near the sealing and guiding package 52. The groove 71 extends between first area 71a and second area 71b in an axial direction. The axial dimension of the areas 71a, 71b without grooves and of groove 71 or of the piston rod extension 51a is determined by the application. For example, in one embodiment the piston rod extension 51a is longer in axial direction than the stroke path of the piston rod 51 so that piston 55 and piston 55a never reach the same point inside the cylinder 48. Further, the first area 71a in which there is no groove is long enough so that the piston 55*a* cannot move to the first end 49 of the cylinder 48 when the flap 3 is completely closed. Of course, other variations will be apparent to the person skilled in the art.

Figure 6:
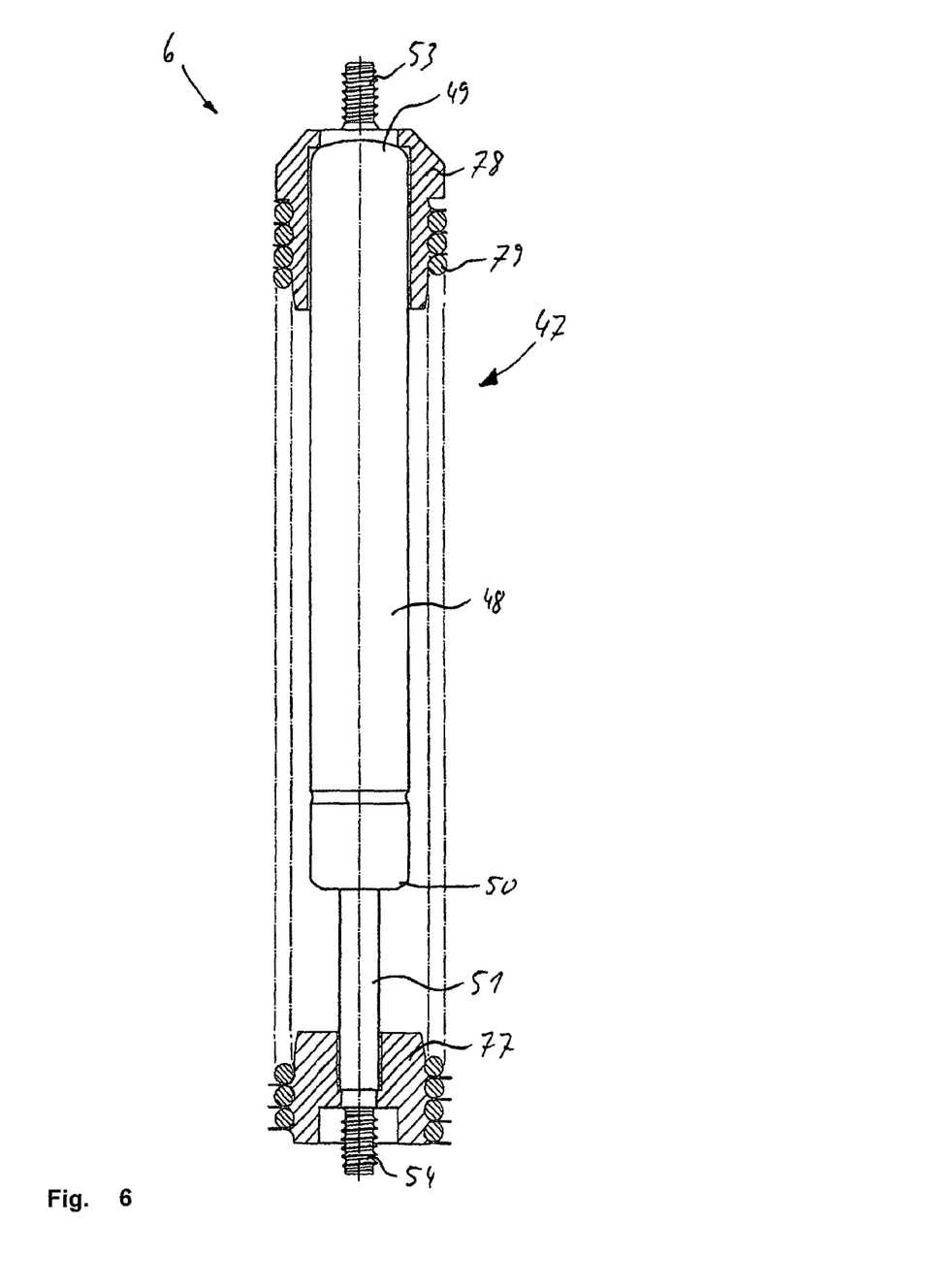
FIG. 6 shows embodiment form of a hydropneumatic drive.

FIG. 6 shows another second drive device 6. Piston-cylinder unit 47 includes the piston cylinder 47 shown in FIGS. 3 and 4. A spring receiving part 77 is arranged at the end of the piston rod 51 projecting out of the cylinder 48 and another spring receiving part 78 is arranged at the first end 49 of the cylinder 48. A helical pressure spring 79 is fixed coaxially around the cylinder 48 by the two spring receiving parts 77 and 78.

The following describes operation of the first and second drive devices 5 and 6. When the flap 3 is opened from its completely closed position, the threaded spindle 29 of the first drive device 5 is set in rotational movement by the rotary drive 18 so that the spindle nut 41 is moved over the threaded spindle with the assistance of the spring device 43 so that the housing 7 and the protective tube 14 are displaced so that they can telescope relative to one another.

At substantially the same time, the piston 55 of the piston-cylinder unit 47 shown in FIG. 3 is displaced in direction of the second end 50 because of the pressure conditions in the cylinder 48 so that the piston rod 51 is moved out of the cylinder 48. A relatively large amount of medium can flow from the first work chamber 56 into the second work chamber 57 through the groove 71. In addition, the sealing ring 64 is displaced in the area of the inclined surface 68 so that additional flow openings are released.

The flap 3 can stop at any desired point in its swiveling path and the electric motor is switched off. The electric motor 19 and the gear unit 22 are not self-locking so friction is low. Movement of the flap 3 is possible by manually applying force to the flap 3. The flap attempts to move down into the closed position because of its own weight. However, the sealing ring 64 is moved on the clamping surface 67 because of the pressure conditions prevailing in the cylinder 48 so that the gas, preferably nitrogen, can no longer flow from the first work chamber 56 into the second work chamber 57 in the cylinder 48. The flap 3 does not move from of its completely closed position.

When the flap 3 is moved farther towards of its completely open position, whether by applying manual force or by means of the first drive device 5, the sealing ring 64 is moved into the area of the inclined surface 68 and the gas can flow again from the first work chamber 56 into the second work chamber 57.

However, if the flap 3 is moved towards its completely closed position, either by manual force or by the first drive device, the piston rod 51 is pushed into the cylinder 48 and the sealing ring 64 is supported at the end portion of the slide surface 63. The sealing ring 64 is pressed against the slide 61 by the pressure in the second work chamber 57 and by the frictional force between the cylinder 48 and the sealing ring 64. When the sum of the frictional force and pressure force is greater than the closing force of the closing spring 60, the slide 61 together with the sealing ring 64 moves in direction of the connection device 54. The gas can flow out of the second work chamber 57 into the first work chamber 56 through a gap formed by the inclined surface 66 and the sealing ring 64.

When the piston rod 51 is not pushed in any farther, the sealing ring 64 is pressed back on the clamping surface 67 again by the pressure conditions prevailing in the second cylinder 48 and by the closing spring 60.

The piston-cylinder unit 48 of the drive device 6 shown in FIG. 4 also functions in a similar manner. As was already described above, only the first partial space 73 of the second work chamber 57 is filled with a gas under pressure, whereas the first work chamber 56 and the second partial space 74 of the second work chamber 57 are filled with oil. Owing to the fact that the first partial space 73 is under pressure and the dividing piston 72 is forced against the oil column, the piston rod 51 attempts to move in the extended direction because of the pressure conditions and surface ratios. The switching of the sealing ring 64 follows the same principles as the piston-cylinder unit described above with reference to FIG. 3.

In the embodiment, form of the drive device 6 shown in FIG. 5, in the closed state of the flap 3 the piston 55 is in the area of the groove 71 and the piston 55*a* is in the first area 71*a* in which there is no groove. When the flap 3 is opened, the piston 55*a* acts in the same way as was described in the closing direction with reference to FIG. 3. The piston 55 is ineffective as long as it is moved in the extended direction. The push-out force acting on the piston rod 51 in the first area 71*a* without the groove includes the gas force acting on the effective surface of the piston 55*a* and the generated holding force of the closing spring 60*a* of the piston 55*a*. When the sealing ring 64*a* of the piston 55*a* reaches the groove 71, the medium located in the interior of the cylinder 47 flows around the sealing ring 64*a* and the piston 55*a* acts like a conventional piston and supports the piston rod 55 moving out of the cylinder 47.

In the almost completely open position of the flap 3, the piston 55 is moved into the second area 71*b* in which there is no groove and functions in the opening direction in the same way as described referring to FIG. 3. If the flap 3 is stopped, the sealing ring 64 is moved on the clamping surface 67 because of the pressure conditions prevailing in the cylinder 48, so that the gas in the cylinder 48 can no longer flow from the first work chamber 56 into the second work chamber 57. The weight of the flap 3 by itself is not sufficient to move toward of its completely closed position. When the flap is completely open, the piston 55*a* is located in the area of the groove 71 and the piston 55 is located in the second area 71*b* in which there is no groove.

When closing the flap 3 by manual force or by means of the first drive device 5, the piston 55 acts in the closing direction in the same way as described referring to FIG. 3. The piston 55*a* acts like a conventional piston by which, because of the pressure conditions prevailing in the cylinder and the effective surface of the piston 55*a*, the piston rod is moved into the cylinder 47 against the moving-out force generated in this way. When the piston 55*a* arrives in the first grooveless area 71*a*, it acts in the opening direction of the flap 3 as was described with reference to FIG. 2 or in the moving-out direction of the piston rod 51. If the flap 3 is stopped, the sealing ring 64*a* moves on the clamping surface 67*a* because of the pressure conditions prevailing in the cylinder 48 so that the gas in the cylinder 48 can no longer flow from the third work chamber 57*a* into the second work chamber 57.

The closing springs 60 and 60*a* installed in the pistons 55 and 55*a* can have different or identical spring forces in order to achieve different switching behavior of the piston in the push-out or push-in directions.

Further, the helical pressure spring 79, which is shown in FIG. 6 arranged coaxially around the piston-cylinder unit 47, increases the extension force of the piston-cylinder unit 47 and compensating for temperature-dependent pressure changes inside the cylinder 48.

Figure 7:
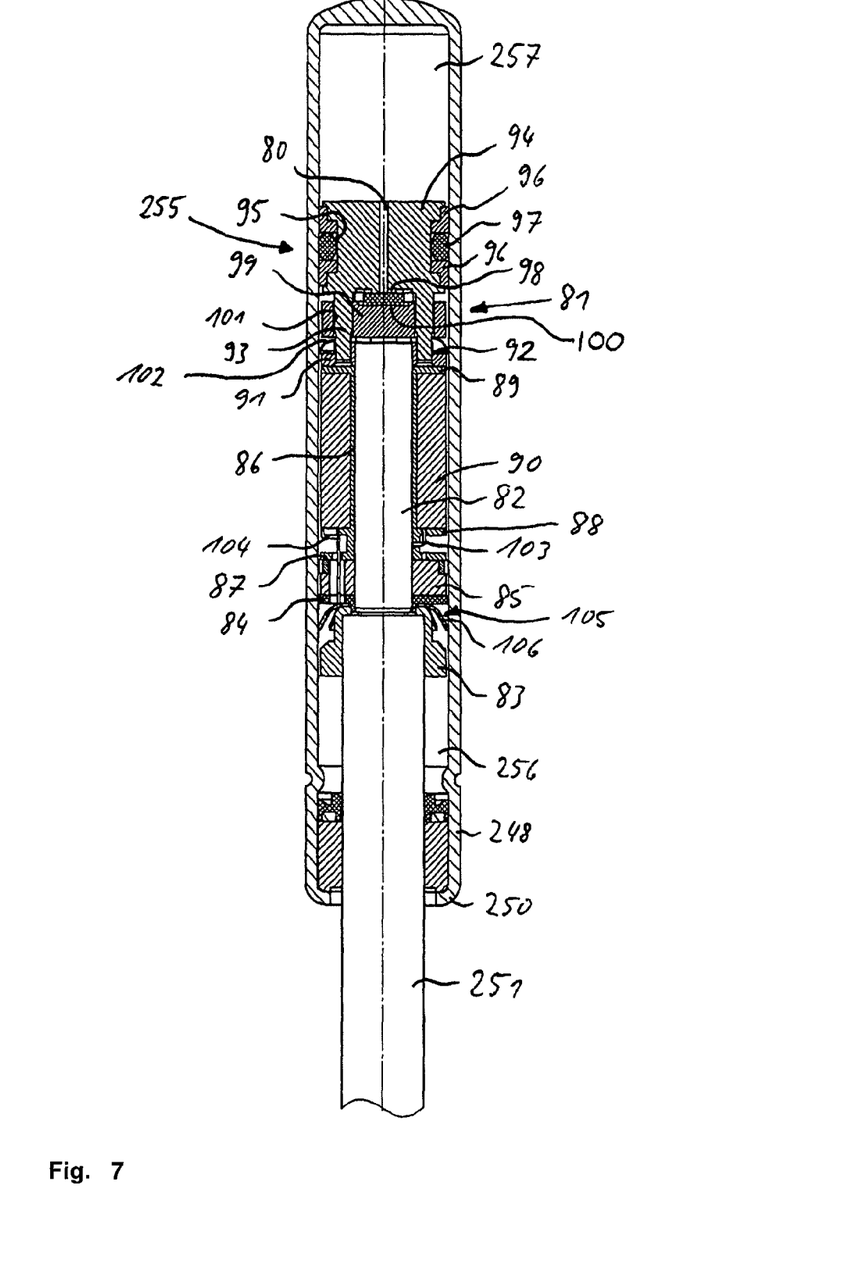
FIG. 7 shows embodiment form of a hydropneumatic drive.

FIG. 7 shows another embodiment of the second drive device 6, parts of which correspond to the embodiment shown in FIG. 3.

The piston-cylinder unit comprises a closed cylinder 248, which is preferably filled with an incompressible fluid under pressure. The interior of the cylinder 248 is divided into a first work chamber 256 and a second work chamber 257 by a piston 255, which is axially displaceable in the cylinder 248. A piston rod 251 is arranged at one side of the piston 255 and is guided through the first work chamber 256 and outward at the seal end 250 of the cylinder 248. A passage 80 leading from the first work chamber 256 to the second work chamber 257 can be opened and closed by an electrically controllable magnetic valve 81.

The end of the piston rod 251 projecting into the cylinder 248 is provided with a coaxial threaded bore hole, 82a (shown in dotted lines), in which a bolt-shaped coil core 82 having a smaller diameter than the piston rod 251 is screwed in by its end which is provided with a thread so that the coil core 82 forms a coaxial extension of the piston rod 251. Other connection possibilities such as, e.g., welding, are also conceivable.

An electrically insulating spacer disk 83 of is arranged on the end of the piston rod 251 projecting into the cylinder 248 and engages around the end of the piston rod on the radial inner side. An insulating ring 84 is arranged on the coil core 82 so as to contact the spacer disk 83 axially and is contacted axially in turn by an annular disk 85 of steel which extends radially outward into the vicinity of the inner wall of the cylinder 248.

An electrically insulating coil carrier 86 preferably encloses the coil core 82 and is arranged on the coil core 82 on the side of the disk 85 remote of the insulating ring 84 and contacts the disk 85 axially by a radial flange 87. A coil 90 to which current can be applied is located between two radial flanges 88 and 89 of the coil core 86 which are arranged at a distance from one another.

A circular disk 91 of paramagnetic material is preferably fixedly arranged on the end of the coil core 82 which is remote of the piston rod 251 and which projects out of the coil carrier 86, this circular disk 91 contacting the coil carrier 86 axially by one of its ends and holding the latter in contact with the disk 85 by its flange 87.

The circular disk 91 extending radially to the vicinity of the inner wall of the cylinder 248 is formed with continuous axial openings 92 which are arranged so as to be uniformly distributed on a concentric circle, and the free ends of correspondingly axially extending pins 93 of a circular-cylindrical piston part 94 of paramagnetic material project into the axial openings 92 and are fastened. The piston part 94 is guided in the cylinder 248 so as to be axially displaceable and has an annular groove 95 at its radially circumferential outer surface.

Two guide rings 96 of electrically nonconductive material are inserted into the annular groove 95 at the two axial ends in such a way that they extend radially until contacting the inner wall of the cylinder 248 for axially guiding the piston part 94.

A sealing ring 97 is inserted into the annular space of the annular groove 95 formed axially between the two guide rings 96 and contacts the inner wall of the cylinder 248 with its outer radially circumferential annular surface and seals the two work chambers 256 and 257 relative to one another.

The coaxially continuous passage 80 is formed in the piston part 94 and its opening facing the coil core 82 forms a valve seat 98.

A disk-like armature 99 with axial play is arranged so as to be movable axially between the front side of the piston part 94, from which the pins 93 protrude axially, and the free end of the coil core 82. The disk-like armature 99 carries on its side facing the valve seat 98 a valve closing member 100 which is formed as an elastomer part and by which the passage 80 is closed when contacting the piston part 94 axially.

The disk-shaped armature 99, which extends radially to the vicinity of the inner wall of the cylinder 248, has axial recesses 101 corresponding to the pins 93 which project through these axial recesses 101.

Accordingly, the armature 99 is guided on the pins 93 so as to be axially displaceable. The armature 99 is acted upon with its valve closing member 100 axially against the valve seat 98 by a pretensioned pressure spring, which is supported at the circular disk 91 and constructed as a spring ring 102.

In this embodiment, power is supplied externally by the piston rod 251 to the first coil end 103 of coil 90. The second coil end 104 of the coil 90 leads to an annular sliding contact 105 which is clamped axially between the spacer disk 83 and the insulating ring 84 and whose sliding arms 106, which project outward approximately radially, contact the inner wall of the grounding cylinder 248 so as to be pretensioned in a springing manner.

In order to move the flap 3, the first drive devices is controlled in such a way that the rotary drive 18 sets the threaded spindle 29 in rotation, and the housing 7 and the protective tube 14 are moved relative to one another. At the same timer, the coil 90 of the second drive device 6 is energized so that the passage 80 in the piston 255 is released and the piston 255 can move in axial direction. When the flap is stopped in a determined position, the two drive devices 5 and 6 are turned off. The passage 80 in the second drive device 6 is closed so that the piston 255 and the piston rod 251 can no longer be moved. The second drive device 6 then holds the flap securely in the adjusted position.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps that perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A system for opening and closing a flap for a motor vehicle, the flap being mounted along a mounting edge of the flap at a stationary structural component of the motor vehicle for swiveling movement around a swiveling axis between a closed position and an open position, the system comprising:
   a non-self-locking drive device coupled between the flap and the stationary structural component, the non-self-locking drive device being an electromechanical drive device, the non-self-locking drive device comprising:
      a tubular housing that is closed at one end by a base piece;
      a first connecting element coupled to the base piece;
      a second connecting element arranged at a second end of the tubular housing opposite the closed end;
      a rotary drive arranged inside the housing proximate to the closed end; and
      a spindle configured to be driven by the rotary drive to axially change a distance between the first and the second connecting elements; and a second drive device acting in parallel with the non-self-locking drive device, the second drive device selected from the group consisting of a hydraulic, pneumatic, and hydropneumatic drive device, the second drive device comprising:
  a cylinder having a closed end articulated at one of the stationary structural component and the flap at a distance from the swiveling axis, the cylinder being at least partially filled with a fluid under pressure;
  a piston that divides an interior of the cylinder into a first work chamber and a second work chamber;
  an axially extending groove formed in the cylinder proximate to the closed end of the cylinder and configured to increase fluid flow when the piston approaches the closed end of the cylinder, the groove having a first slope leading into the groove proximate to the closed end of the cylinder and a second slope leading into the grove remote from the closed end of the cylinder, wherein the first slope is steeper than the second slope;
  a piston rod having a first end coupled to the piston, a second end of the piston rod being guided through and out of the first work chamber and articulated at the other of the one of the flap or the stationary structural component at a distance from the swiveling axis;
  a sealing and guiding package adapted to guide the piston rod through and out of the first work chamber;
  a valve arrangement forming a fluid flow connection between the first work chamber and the second work chamber;
  wherein the valve arrangement is closed when the flap is stationary, and
  wherein the non-self-locking drive device is arranged at a first edge of the flap and the second drive device is arranged at a second edge of the flap opposite the first edge of the flap, each edge extending at substantially a right angle from the swiveling axis,
  whereby the fluid flow, as the flap enters and exits the closed position, bypasses the valve arrangement via the axially extending groove;
  a first spring receiving part arranged at the second end of the piston rod;
  a second spring receiving part arranged at the closed end of the cylinder; and
  a spring arranged coaxially around an outside of a housing of the second drive device and fixed to and disposed between the first and the second spring receiving parts to increases an extension force of the second drive device.

2. The system for opening and closing a flap according to claim 1, wherein the flap is selected from the group consisting of a hatchback, a trunk hood, a door, and an engine hood.

3. The system for opening and closing a flap according claim 1, wherein the flap is supported along the mounting edge so as to be substantially vertical in the closed position and substantially horizontal in the open position.

4. The system for opening and closing a flap according claim 1, wherein the non-self-locking drive device comprises:
  the spindle which comprises a threaded spindle coupled to the rotary drive and adapted to rotatably drive the threaded spindle, the threaded spindle coupled to one of the flap and the stationary structural component; and
  a spindle nut arranged on the threaded spindle coupled to the other of the one of the stationary structural component and the flap not coupled to the threaded spindle.

5. The system for opening and closing a flap according to claim 4, further comprising a non-self-locking gear unit coupled between the threaded spindle and the rotary drive.

6. The system for opening and closing a flap according to claim 4, wherein the rotary drive is an electric motor.

7. The system for opening and closing a flap according to claim 4, further comprising the tubular housing in which at least the rotary drive, the threaded spindle, and the spindle nut are arranged.

8. The system for opening and closing a flap according to claim 4, further comprising a spindle tube adapted to enclose the threaded spindle, the spindle tube being connected to the spindle nut at an axial end of the spindle tube closer to the rotary drive and being coupled to one of the stationary structural component and the flap at the axial end of the spindle tube remote of the rotary drive.

9. The system for opening and closing a flap according to claim 7, further comprising a protective tube connected to the spindle nut on an end area of the tubular housing remote from the rotary drive and coupled to the stationary structural component or flap by an end of the protective tube remote from the rotary drive.

10. The system for opening and closing a flap according to claim 1, wherein the second drive device is a gas spring, the first work chamber and second work chamber being filled with a gas under pressure.

11. The system for opening and closing a flap according to claim 10, further comprising a piston rod extension extending from the second end of the piston rod, wherein the piston, the piston rod, and the piston rod extension are arranged coaxial to the cylinder.

12. The system for opening and closing a flap according to claim 11, further comprising a second piston arranged at the end of the piston rod extension.

13. The system for opening and closing a flap according to claim 12, wherein the pistons each have a closing spring, wherein the closing springs having substantially identical or different spring forces.

14. The system for opening and closing a flap according to claim 1, wherein the cylinder of the second drive device has a dividing piston, the dividing piston being axially displaceable in the cylinder defining a partial space between the closed end of the cylinder and the second work chamber in the cylinder, wherein the partial space is filled with a gas under pressure.

15. The system for opening and closing a flap according to claim 4, wherein the first work chamber and second work chamber are filled with an incompressible fluid.

16. The system for opening and closing a flap according to claim 15, wherein the incompressible fluid is an oil.

17. The system for opening and closing a flap according to claim 1, wherein the valve arrangement includes a closing valve having a valve element by which three switching positions can be occupied, wherein, proceeding from a middle closed switching position, a first opening position can be occupied by the valve element in one direction from the middle closed switching position and a second open position can be occupied by the valve element in an other direction opposite the one direction.

18. The system for opening and closing a flap according to claim 1, wherein the valve arrangement is an electrically controllable magnetic valve.

19. The system for opening and closing a flap according to claim 18, wherein the magnetic valve is powered on so as to open the flow connection between the first work chamber and the second work chamber by controlling the non-self-locking drive device for the flap adjustment.

20. The system for opening and closing a flap according to claim 19, wherein the valve arrangement is arranged in the piston.

* * * * *